United States Patent
Mullinax et al.

(10) Patent No.: US 7,259,114 B2
(45) Date of Patent: Aug. 21, 2007

(54) HIGH-STRENGTH, LOW-COST, RECYCLABLE BACKING FOR FABRICS

(75) Inventors: Larry Mullinax, Cartersville, GA (US); Shannon VanScoy, Emerson, GA (US); Daniel R. Hoyt, Cartersville, GA (US)

(73) Assignee: Textile Rubber & Chemical Company, Inc., Dalton, GA (US)

( * ) Notice: Subject to any disclaimer, the term of this patent is extended or adjusted under 35 U.S.C. 154(b) by 0 days.

(21) Appl. No.: 10/928,348

(22) Filed: Aug. 27, 2004

(65) Prior Publication Data

US 2005/0048245 A1    Mar. 3, 2005

Related U.S. Application Data

(60) Provisional application No. 60/481,318, filed on Sep. 1, 2003.

(51) Int. Cl.
*B32B 5/12* (2006.01)
*B32B 5/18* (2006.01)
*B32B 5/24* (2006.01)
*B32B 25/02* (2006.01)
*B32B 27/04* (2006.01)

(52) U.S. Cl. .............. 442/58; 428/94; 428/95; 428/96; 428/97; 428/147; 428/158; 428/159; 442/30; 442/37; 442/104; 442/154

(58) Field of Classification Search ............ 428/94, 428/95, 96, 97, 147, 158, 159; 442/30, 37, 442/58, 104, 154
See application file for complete search history.

(56) References Cited

U.S. PATENT DOCUMENTS

| | | |
|---|---|---|
| 5,240,530 A | 8/1993 | Fink |
| 5,288,349 A | 2/1994 | Fink |
| 5,728,444 A | 3/1998 | Fink |
| 6,051,300 A | 4/2000 | Fink |
| 6,291,048 B1 | 9/2001 | Jerdee et al. |
| 6,468,623 B1 | 10/2002 | Higgins |
| 6,528,437 B1 | 3/2003 | Hepfinger et al. |
| 2001/0046581 A1 | 11/2001 | Brumbelow et al. |
| 2002/0134486 A1 | 9/2002 | Brumbelow et al. |
| 2003/0161990 A1 | 8/2003 | Higgins et al. |
| 2003/0211280 A1 | 11/2003 | Brumbelow et al. |
| 2004/0079467 A1 | 4/2004 | Brumbelow et al. |

OTHER PUBLICATIONS

Webster's Ninth New Collegiate Dictionary, 1990, p. 159, definitions of "blend".*

* cited by examiner

*Primary Examiner*—Patrick Niland
(74) *Attorney, Agent, or Firm*—King + Spalding

(57) ABSTRACT

A backing material is made of low-density and/or high-density polyethylene(s) and/or a flexibilizer to provide high-strength, low-cost, and recyclable backing material for fabrics. The backing material can incorporate polypropylene(s), additional flexibilizers, fillers, flame-retardants, anti-microbials, odor minimizers/eliminators, scent, and protectants for further desired properties.

33 Claims, 6 Drawing Sheets

HIGH-STRENGTH, LOW-COST, RECYCLABLE BACKING FOR FABRICS

CROSS-REFERENCE TO RELATED APPLICATION

This application claims the benefit of States provisional patent application Ser. No. 60/481,318, filed on Sep. 1, 2003.

FIELD OF THE INVENTION

This invention is generally directed to a backing material for fabrics and a method for making that backing. More specifically, the invention is directed to a backing for fabrics, such as carpets, rugs, mats, and any other textiles or products where it is necessary or desirable to bind any fibers or material to itself, each other, a backing, and/or a substrate. This includes fabrics that are tufted, non-tufted, woven, non-woven, knitted, pile knitted, or needlepoint.

BACKGROUND OF THE INVENTION

Weaving two strands of filament, usually called the weft and the warp, generally makes woven textiles. A third strand, the pile, is included to make woven carpet. The pile can be formed of free ends or of loops. Sometimes the loops of the pile are cut to form tufts. Tufts are also sometimes inserted individually rather than as part of the continuous weave, such as by stitching the tufts to a previously woven or non-woven fabric, or by needle-punching fibers into a woven or non-woven substrate.

For many woven and non-woven fabrics, it is desirable to apply a backing to the fabric. Backings are applied to carpets, carpet tiles, moldable carpets, liners, covers, mats, moldable mats, rugs, moldable rugs, and other applications. Backings can be used to obtain fiber-lock performance and tuft-lock performance, give stability and structural integrity to the fabric, afford non-skid characteristics, and provide various levels of flame retardancy. A structural layer, such as fiberglass, can be incorporated into the backing layer for further strength and dimensional stability.

Traditionally, latex or hot melt adhesives have been used for backing of fabrics and especially for backing of carpets, mats, and rugs. Both adhesives provide strength, penetration, and flexibility; key criteria in the selection of a backing material. Both adhesives, however, have drawbacks.

Conventionally-used latex requires the use of high-energy drying ovens, which increases operating costs. In addition, latex-based products lose strength when subjected to water and regain only a portion of their strength when dry. In addition to these drawbacks generally associated with latex, there can be further product-specific drawbacks. For example, the existing products on the market for the washable mat and rug business use a latex backing, but sacrifice fiber-lock and tuft-lock performance in order to achieve the desired non-skid and machine-wash properties.

Conventionally-used hot melt applications require the use of special compounding equipment, which increases operating costs. In addition, hot melt requires the use of additives such as tackifiers and heat stabilizers which increase product cost and also degrade and impair product performance over time.

Another material often used for backing for carpets is polyvinyl chloride. This material, however, as is well known, creates smoke and extremely toxic fumes upon combustion and is therefore undesirable for indoor use.

Accordingly, a need exists for a backing material that is strong, durable, inexpensive, recyclable, able to be applied to fabrics without the use of drying ovens, able to eliminate the need for undesirable processing additives, and able to incorporate custom additives without product degradation or impairing performance as needed for specific product enhancements. The present invention meets this need. Other features and advantages of the present invention will become clear upon a reading of the attached specification.

SUMMARY OF THE INVENTION

It is a general object of the present invention to present a backing material for use on fabrics that is strong, inexpensive, and easy and energy efficient to produce and apply.

It is a further object of the present invention to present a backing material for woven fabrics that is strong, inexpensive, flame retardant, and easy and energy efficient to produce and apply. Some of these fabrics include swimming pool covers and primary backing for the tufting of carpet.

It is a further object of the present invention to present a backing material for non-woven fabrics that is strong, inexpensive, flame retardant, and easy and energy efficient to produce and apply. Some of these fabrics include mattress covers, non-woven primary backing for carpet tufting, and fabric for cured-in-place piping.

It is yet a further object of the present invention to present a backing material for fabrics where it is necessary or desirable to bind any fibers or material to itself, each other, another backing, and/or a substrate. These fabrics include tufted, non-tufted, woven, non-woven, knitted, pile knitted, or needlepoint fabrics.

It is yet a further object of the present invention to present a backing material that is readily recyclable.

It is yet a further object of the present invention to present a backing material that can incorporate performance additives and fillers.

It is yet a further object of the present invention to present a method for making such a backing material.

Briefly, and in accordance with the foregoing, the present invention provides a backing material made through the use of extrusion compounding, whereby the raw materials are compounded in-line rather than in a separate compounding operation. Through the use of extrusion compounding of high melt index, low-density polyethylene(s), polypropylene(s), high-density polyethylene(s), flexibilizer(s), and/or other additives, a backing material is created that offers more desirable strength, penetration, and flexibility combinations than backings made with other materials or methods.

The backing material of the present invention has superior bundle penetration/fiber-lock, tuft bind/stitch-lock, wet tuft bind, lamination strength, dimensional stability, flame and smoke test results, and moisture barrier test results, as compared to the backing materials known in the prior art.

Additionally, because extrusion compounding is utilized rather than a method requiring tackifiers, heat stabilizers, or the addition of other impurities, unused material and post-consumer waste is easily recyclable by grinding and reintroduction of the unused material into the extrusion compounding method. The backing material is not aqueous based, which eliminates the need for drying ovens. The backing material is insoluble; therefore it retains its strength when exposed to water and/or steam. The backing material is nonabrasive and durable and provides lamination strength, flame retardancy, and smoke performance. The backing material is of lower weight than comparable backing materials and requires less energy to produce. The combination of this method and the ingredients used as set forth herein eliminates the incorporation of thermally degradable ingredients as well as those ingredients that weaken when subjected to moisture or water. In addition, the extrusion compounding method allows for the efficient introduction of ingredients such as flame-retardants, anti-microbials, odor minimizers/eliminators, structural fillers, scent additives, and sun, salt, oil, gasoline, diesel, and petroleum protectants or inhibitors.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION

Figure 1:
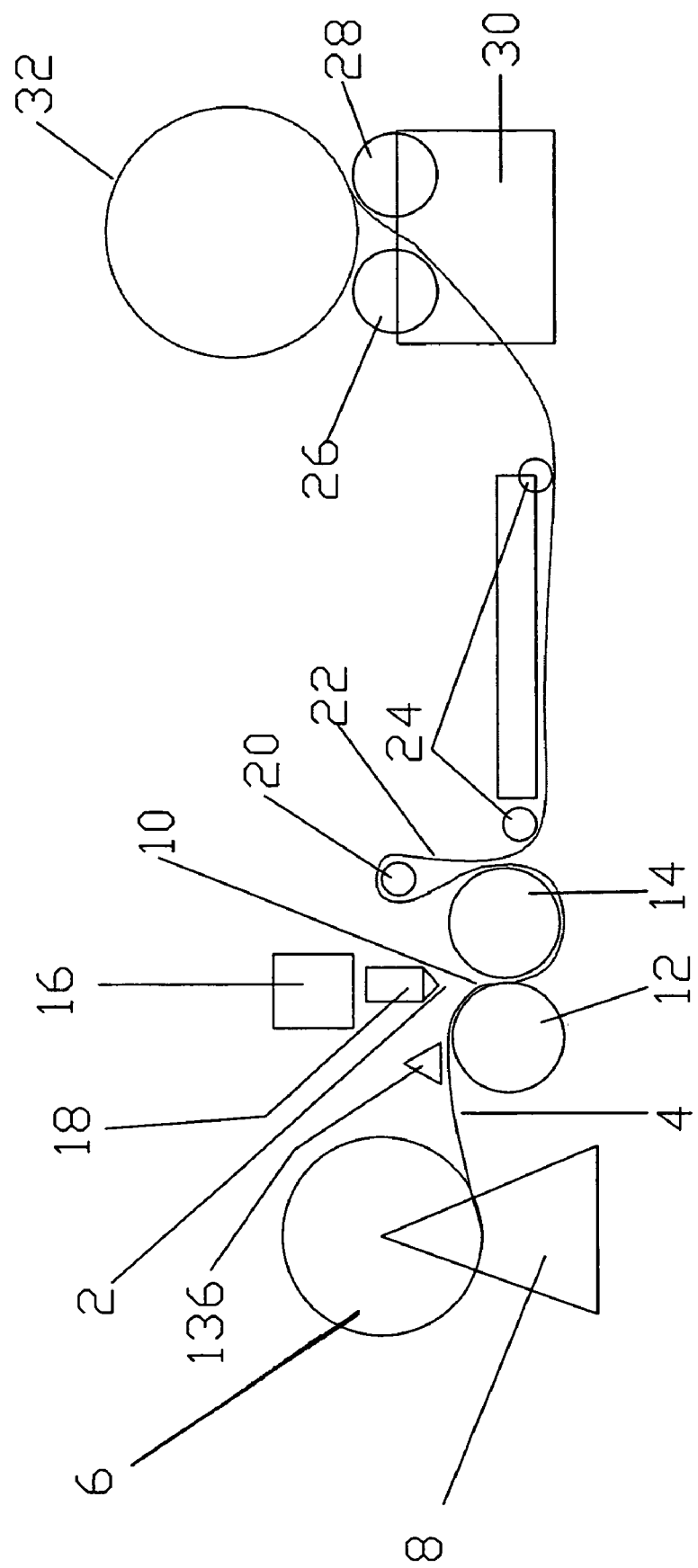
FIG. 1 is a diagram of the components in a method for applying a backing material that incorporates the features of the present invention to a fabric.

As used herein the term "Melt Index" means a measurement performed by measuring the number of grams of thermoplastic resin at a standard temperature that passes through a standard size orifice in 10 minutes under a standard weight or force. The units of measurement of Melt Index are expressed as grams/10 minutes.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

A backing material is a material applied to a fabric, such as carpets, carpet tiles, moldable carpets, liners, covers, mats, moldable mats, rugs, and other applications to obtain fiber-lock performance, tuft-lock performance, increased stability and structural integrity, non-skid characteristics, and/or flame retardancy. The backing material of the preferred embodiment of the present invention has basic ingredients of high melt index low-density polyethylene ("LDPE") and flexibilizers. Other LDPE or high-density polyethylene ("HDPE") can be used for increased strength and as a polymeric cost-reducing replacement for high melt index LDPE and/or flexibilizers. HDPE, although more expensive than LDPE, is stronger, more scratch resistant, more abrasion resistant, and more dimensionally stable than LDPE. The choice of which of these two materials to use depends on the requirements of the application and the cost of the available commodities.

The general composition of the backing material of the present invention is some combination of the following ingredients having the following properties:

1. LDPE having:
   i. A low molecular weight, i.e. number average molecular weight, $M_n$, less than about 10,000, or weight average molecular weight, $M_w$, less than about 35,000, and/or
   ii. High melt indices (MI greater than about 1,000 grams/10 min. (190 C/2.16 kg)); and/or
   iii. Specific gravity less than or equal to 0.92.
2. HDPE having a specific gravity greater than 0.92.
3. High melt index (MI greater than about 1,000) polypropylene (as needed to cross-link for higher strength);
4. Flexibilizers, used to provide flexibility to the backing material, such as contained-geometry catalyzed low density polyethylene (specific gravity less than about 0.92), ethylene methyl acrylate, ethylene vinyl acetate, ethylene butyl modified polyethylenes, KRATON® rubber, and other thermoplastic elastomers or thermoplastic rubbers;
5. Fillers, such as magnesium hydroxide (sometimes called brucite), Portland cement, and calcium oxide, to provide strength, flame retardancy, and aquasetting, or post-consumer and/or production recycled thermoplastics;
6. Stearic acid to create dispersants, such as magnesium stearate or calcium stearate, to increase the ability of the flexibilizer to mix with the LDPE, HDPE, and polyethylene;
7. Additives such as flame retardants, anti-microbials, odor eliminators, odor minimizers, scents, and inhibitors to protect from sun, salt, oil, gasoline, diesel fuel, or other petroleum derivatives (as needed, depending on the specific application and requirements of the customer).

The use of these ingredients is comparatively inexpensive as compared to the ingredients of the backing materials known in the prior art. These ingredients produce a backing material that is insoluble in water, and therefore one that will retain its strength when exposed to water or steam, providing an advantage over prior art backing materials that weaken when exposed to water or that contain thermally-degradable additives. The backing material made of these materials is nonabrasive and durable and of lower weight than the backing materials known in the prior art, all criteria important to consumers.

The proportions of the ingredients to be used to create the backing material depend on the end use of the fabric to which the backing material will be applied.

A backing material for loop pile carpet is a compound of low molecular weight, high melt index LDPE, low specific gravity, average melt index LDPE or HDPE, high melt index polypropylene, flexibilizers, and anti-microbials. The following table sets forth the preferred formulation and the range of concentrations of these ingredients:

TABLE 1A

Loop Pile Carpet

| Element | Percentage Used | Preferred Formulation |
|---|---|---|
| 1. Low Mol. Wt., High MI LDPE | 22-53% | 40% |
| 2. Low Specific Gravity, Avg. MI LDPE or HDPE | 22-53% | 8% |
| 3. High MI Polypropylene | 0-10% | As needed |

TABLE 1A-continued

Loop Pile Carpet

| Element | Percentage Used | Preferred Formulation |
|---|---|---|
| 4. Flexibilizers | 0-25% | 12% |
| 5. Anti-Microbials or other additives | 0-2% | As needed |
| 6. Fillers | 25-60% | 40% |

A backing material for cut pile carpet is a compound of low molecular weight, high melt index LDPE, low specific gravity, average melt index LDPE or HDPE, high melt index polypropylene, flexibilizers, anti-microbials, and fillers. The following table sets forth the preferred formulation and the range of concentrations of these ingredients:

TABLE 1B

Cut Pile Carpet

| Element | Percentage Used | Preferred Formulation |
|---|---|---|
| 1. Low Mol. Wt., High MI LDPE | 15-38% | 20% |
| 2. Low Specific Gravity, Avg. MI LDPE or HDPE | 15-60% | 15% |
| 3. High MI Polypropylene | 0-10% | As needed |
| 4. Flexibilizers | 0-25% | 15% |
| 5. Anti-Microbials or other additives | 0-2% | As needed |
| 6. Fillers | 25-60% | 50% |

A backing material for automotive or marine carpet is a compound of low molecular weight, high melt index LDPE, low specific gravity, average melt index LDPE or HDPE, high melt index polypropylene, flexibilizers, anti-microbials, and fillers. The following table sets forth the preferred formulation and the range of concentrations of these ingredients:

TABLE 1C

Automotive or Marine Carpet

| Element | Percentage Used | Preferred Formulation |
|---|---|---|
| 1. Low Mol. Wt., High MI LDPE | 15-38% | 20% |
| 2. Low Specific Gravity, Avg. MI LDPE or HDPE | 15-60% | 15% |
| 3. High MI Polypropylene | 0-10% | As needed |
| 4. Flexibilizers | 0-15% | 15% |
| 5. Anti-Microbials or other additives | 0-2% | As needed |
| 6. Fillers | 25-60% | 50% |

A backing material for washable rugs and mats, such as bathroom mats, is a compound of low molecular weight, high melt index LDPE, low specific gravity, average molecular weight LDPE or HDPE, flexibilizers, antimicrobials, and fillers. The following table sets forth the preferred formulation and the range of concentrations of these ingredients:

TABLE 1D

Washable Rugs and Mats

| Element | Percentage Used | Preferred Formulation |
|---|---|---|
| 1. Low Mol. Wt., High MI LDPE | 0-38% | 20% |
| 2. Low Specific Gravity, Avg. MI LDPE or HDPE | 0-50% | As Needed |

TABLE 1D-continued

Washable Rugs and Mats

| Element | Percentage Used | Preferred Formulation |
|---|---|---|
| 3. High MI Polypropylene | 0 | 0 |
| 4. Flexibilizers | 0-100% | 40% |
| 5. Anti-Microbials or other additives | 0-2% | As Needed |
| 6. Fillers | 0-60% | 40% |

A backing material for non-skid absorbent mats, which are generally made of an absorbent non-woven material, is a compound of LDPE or HDPE, flexibilizers, anti-microbials, and fillers. The following table sets forth the preferred formulation and the range of concentrations of these ingredients:

TABLE 1E

Non-skid Absorbent Mats

| Element | Percentage Used | Preferred Formulation |
|---|---|---|
| 1. Low Mol. Wt., High MI LDPE | 0 | 0 |
| 2. Low Specific Gravity, Avg. MI LDPE or HDPE | 0-50% | 15% |
| 3. High MI Polypropylene | 0 | 0 |
| 4. Flexibilizers | 0-100% | 35% |
| 5. Anti-Microbials or other additives | 0-2% | As Needed |
| 6. Fillers | 0-70% | 50% |

The backing material for woven polypropylene fabrics is a compound of LDPE or HDPE, high melt index, low-density and/or high-density polyethylene, flexibilizers, anti-microbials, and fillers. The following table sets forth the preferred formulation and the range of concentrations of these ingredients:

TABLE 1F

Woven Polypropylene Fabrics

| Element | Percentage Used | Preferred Formulation |
|---|---|---|
| 1. Low Mol. Wt., High MI LDPE | 0-25% | As Needed |
| 2. Low Specific Gravity, Avg. MI LDPE or HDPE | 0-75% | 50% |
| 3. High MI Polypropylene | 0 | 0 |
| 4. Flexibilizers | 0-50% | 25% |
| 5. Anti-Microbials or other additives | 0-2% | As Needed |
| 6. Fillers | 0-50% | 25% |

A backing material for non-woven fabrics is a compound of LDPE or HPDE, high melt index polypropylene, flexibilizers, antimicrobials, and fillers. The following table sets forth the preferred formulation and the range of concentrations of these ingredients:

TABLE 1G

Non-Woven Fabrics

| Element | Percentage Used | Preferred Formulation |
|---|---|---|
| 1. Low Mol. Wt., High MI LDPE | 0 | 0 |
| 2. Low Specific Gravity, Avg. MI LDPE or HDPE | 0-100% | 30% |
| 3. High MI Polypropylene | 0-25% | As Needed |

TABLE 1G-continued

Non-Woven Fabrics

| Element | Percentage Used | Preferred Formulation |
|---|---|---|
| 4. Flexibilizers | 0-100% | 70% |
| 5. Anti-Microbials or other additives | 0-2% | As Needed |
| 6. Fillers | 0-50% | As Needed |

We have discovered that low molecular weight, high melt index LDPE provides superior bundle penetration when used with fabrics having a pile, such as carpet. Low molecular weight, high melt index LDPE has not been used conventionally in extruders, and is difficult to extrude. However, the novel combination of low molecular weight, high melt index LDPE and a flexibilizer has been found to extrudable in a co-rotating twin-screw extruder.

The preferred flexibilizer is contained-geometry, catalyzed LDPE. This material is available in wide spec and accordingly can be obtained for lower cost than other flexibilizers, although more expensive, virgin material can be used also. Other flexibilizers, as described above, are available but are generally more expensive.

Accordingly, the backing material of the present invention is preferably made by metering the ingredients to a starve-fed co-rotating twin-screw extruder. Co-rotating twin screw extruders can operate at higher processing rotational speeds than counter-rotating twin screw extruders or single screw extruders and accordingly are more efficient and versatile. Additionally, the use of co-rotating screws causes higher shear at the mixing point, allowing for processing at lower pressure and temperature, which is easier and more energy efficient than the methods known in the prior art.

The use of in-line, extrusion compounding produces a backing material that has more desirable strength, penetration, and flexibility than backing materials known in the prior art. Additionally, in-line, extrusion compounding of the ingredients described above creates a backing material with superior bundle penetration/fiber-lock, tuft bind/stitch-lock, wet tuft bind, lamination strength, dimensional stability, flame and smoke test results, and moisture barrier test results as compared to the backing materials known in the prior art.

Mixing in the extruder, instead of in a separate operation, also allows for the incorporation of ingredients such as fillers, flexibilizers, and performance enhancers such as anti-microbials. For example, flame retardants, including but not limited to magnesium hydroxide, can be added to the extruder mixture. Numerous antimicrobial agents as are well known in the art can be added to the extruder mixture. Scent of any desired type can be added to the extruder mixture. Portland cement or other inorganic material can be added to the extruder mixture to maintain or improve strength of the backing material. Stearic acid, if added to the extruder mixture, will react and create dispersants such as magnesium stearate or calcium stearate. Photoresistant chemicals are well known in the art and can be added to the extruder mixture. Odor minimizers and odor eliminators are well known in the art and can be added to the extruder mixture. Additives to protect against sun, salt or against petroleum-derived materials such as gasoline, oil, diesel fuel, or other petrofuels or petrochemicals are well known in the art and can be added to the extruder mixture.

Moreover, in-line extrusion compounding of the ingredients described above eliminates the need for tackifiers, heat stabilizers, or other impurities required by the methods known in the prior art. Unused backing material, whether industrial surplus or post-consumer waste is easily recyclable by grinding the unused backing material and reintroducing it into the extruder.

Preferred processing temperatures for the step of mixing the ingredients in the extruder are dependent upon the range of temperatures at which the polymers stay stable and the range of temperatures that provide the best performance of the final product. The following table lists these processing temperature ranges along with the preferred processing temperature for the present invention:

TABLE 4

Processing Temperature Ranges (Degrees F.)

| Method | Polymer Stability | Product Performance | Preferred Operating |
|---|---|---|---|
| 1. Mixing | 200-600 | 250-500 | 325-425 |
| 2. Pumping | 200-600 | 325-500 | 375-450 |
| 3. Coating | 200-600 | 325-500 | 375-450 |
| 4. Fabric Pre-Heat | 75-300 | 120-240 | 150-200 |
| 5. Cooling | 32-175 | 70-150 | 75-110 |

By using extrusion, formulations can be changed while running, saving processing time by reducing or eliminating set up time.

Figure 2:
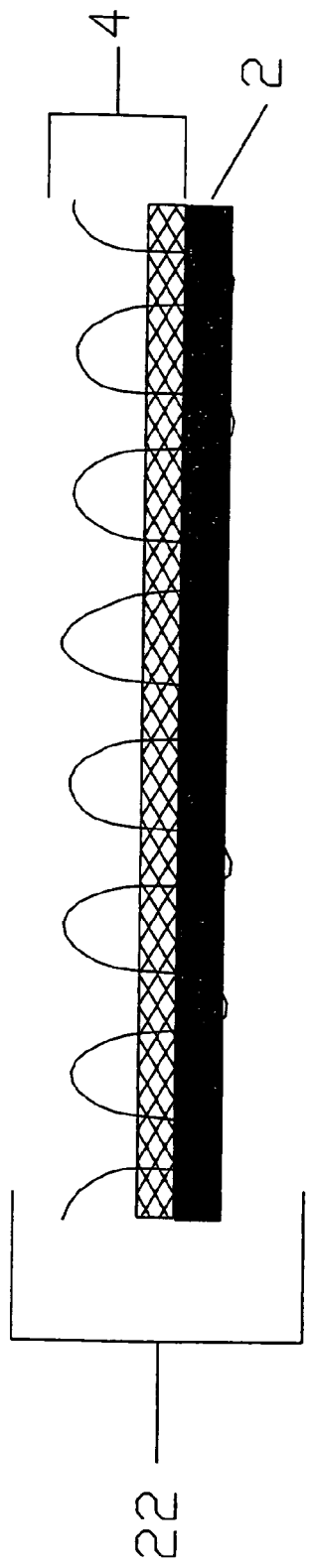
FIG. 2 is a cross-sectional view of a product produced using the method depicted in FIG. 1.
Figure 3:
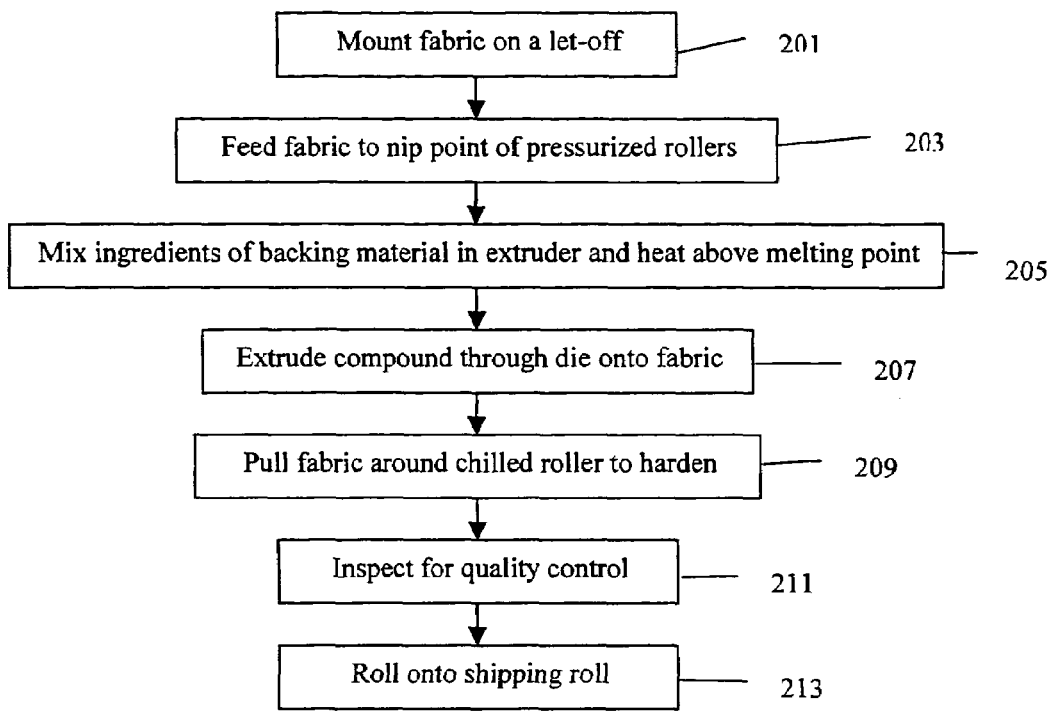
FIG. 3 is a flow chart of the method diagrammed in FIG. 1.

FIG. 1 shows the components of the method for applying the backing material 2, which incorporates the features of the present invention, to the fabric 4 such as a carpet. FIG. 2 shows a product produced using the method depicted in FIG. 1. The composite 22 shown in FIG. 2 is made up of fabric 4 and backing material 2. FIG. 3 is a flow chart of the method.

A roll 6 of fabric 4 is mounted on a let off 8 (step 201). The fabric 4 is fed to the in-running nip point 10 of a pair of pressurized rollers 12, 14 (step 203). Roller 14 is chilled. The backing material 2, having been mixed in a twin-screw extruder 16 and heated above its melting point (step 205), is pushed through a die 18 and into the nip point 10 formed by the rollers 12, 14 (step 207). The pressure at nip point 10 is preferably sufficient to cause the backing material 2 to adhere to the fabric 4. Additionally, if the fabric has a pile, the pressure at nip point 10 is preferably sufficient to cause the backing material to penetrate the bundles of the pile and provide fiberlock in the fabric-backing-material composite 22. In the preferred embodiment, this pressure is above 100 pounds per linear inch and is adjusted for different types of fabrics.

Directional roller 20 pulls the fabric 4 around roller 14, keeping the fabric 4 and backing material 2 in contact with the chilled roller 14 for as long as feasible, in order to harden the backing material 2 (step 209). The now married fabric-and-backing-material composite 22 then feeds through directional rollers 24, 26, 28, for final inspection (step 211) before shipping, to roll up 30, where it is rolled into shipping roll 32 (step 213).

Figure 5:
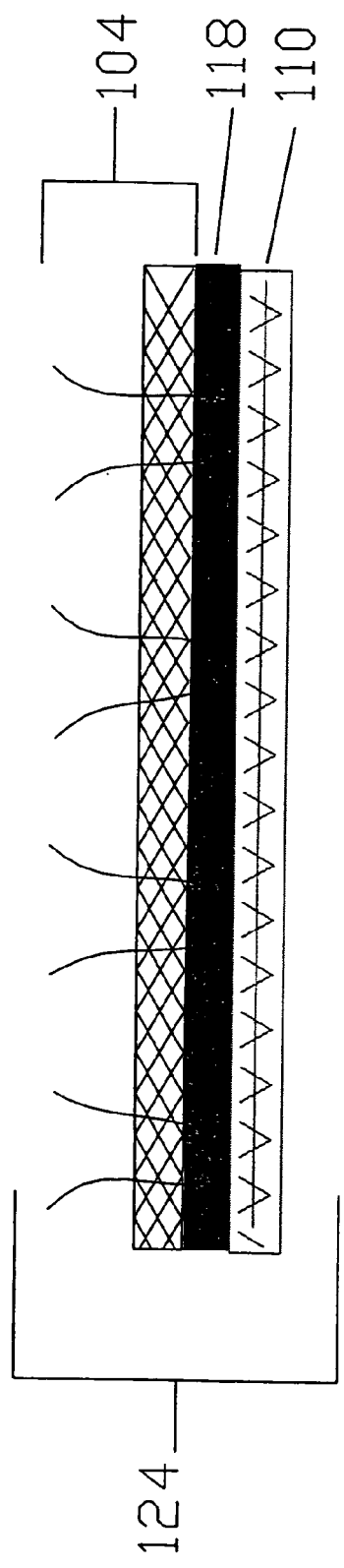
FIG. 5 is a cross-sectional view of a product produced using the method depicted in FIG. 4.
Figure 4:
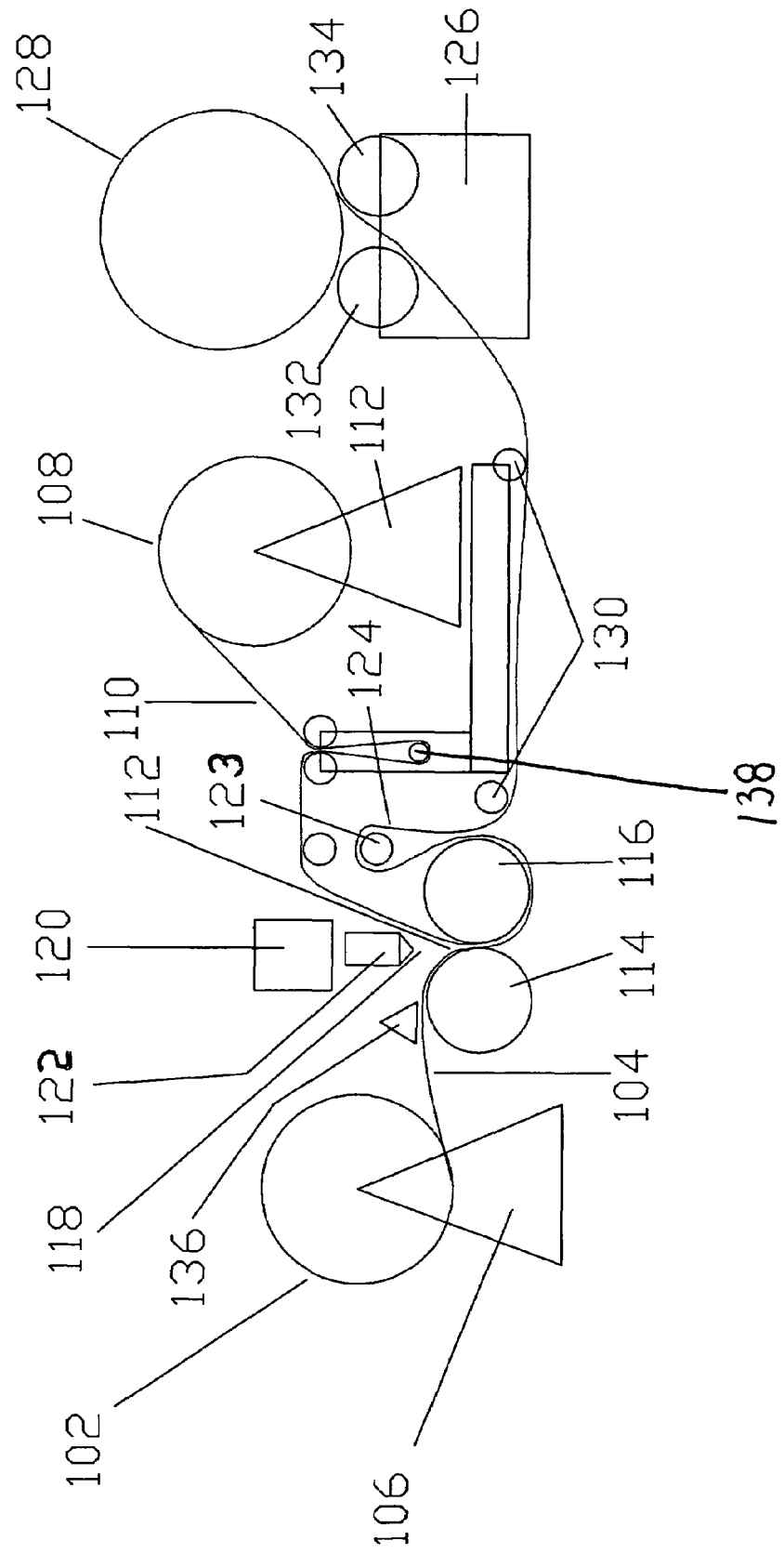
FIG. 4 is a diagram of the components of a method for applying a backing material that incorporates the features of the present invention to a fabric and a structural substrate.
Figure 6:
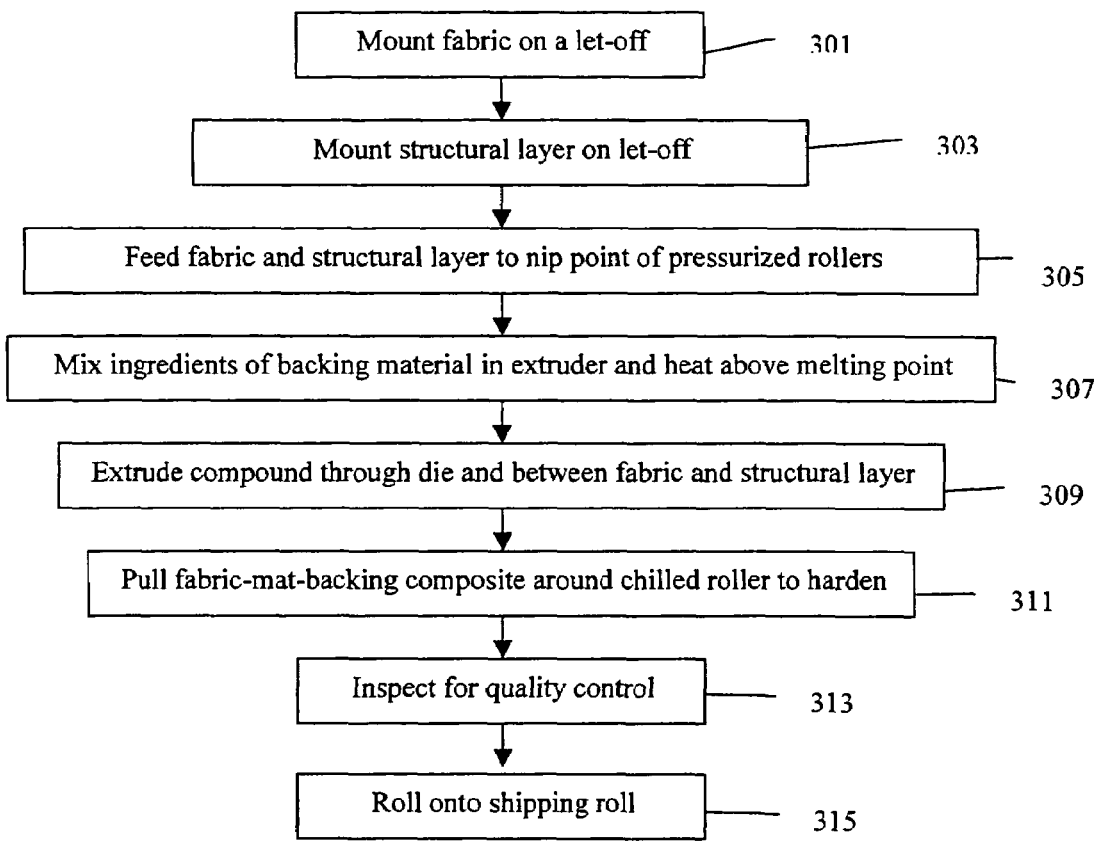
FIG. 6 is a flow chart of the method diagrammed in FIG. 4.

FIG. 4 shows the components of the method for applying a backing material that incorporates the features of the present invention, along with a structural substrate, to a fabric such as a carpet. The structural substrate imparts greater strength and dimensional stability to the fabric. The structural substrate can be woven or non-woven and can be made of fiberglass, basalt, polypropylenes, polyolefins, polymerized non-olefins, polyamides, polyesters, nylon, or any other threads, yarns, fibers, filaments, or meshes, or combinations of any of these materials. The structural substrate can also be a preformed foam, such as a thermoplastic material or a thermoset material, and can be a chemically-blown foam or a mechanically-blown foam, either stabilized or unstabilized. FIG. 5 is a cross-sectional view of a product made by the method in FIG. 4. The composite 124 is made up of fabric 104, such as cut pile carpet, backing material 118, and a structural substrate 110. FIG. 6 is a flow chart of the method.

To apply the backing material 118 of the present invention to the fabric 104, along with the structural substrate 110, a roll 102 of fabric 104 is mounted on a first let off 106 (step 301). A roll 108 of structural substrate 110 is mounted on a second let off 112 (step 303). A compensator 138 is used to keep a constant tension on the structural substrate 110. A compensator or "dancer" is conventional and accordingly will not be further described. Both the fabric 104 and the substrate 110 are fed to the in-running nip point 112 of a pair of rollers 114, 116 (step 305).

The backing material 118, having been mixed in a twin-screw extruder 120 and heated above its melting point (step 307), is pushed through a die 122 (step 309) and into the nip point 112 formed by the rollers 114, 116, between fabric 104 and substrate 110. The pressure of pressurized rollers 114, 116 marries the fabric 104 to the substrate 110, as backing material 118 penetrates into both fabric 104 and substrate 110. Roller 116 is chilled. Directional roller 123 pulls the now-married fabric-backing-material-substrate composite 124 around roller 116, keeping the fabric-backing-material-substrate composite 124 in contact with chilled roller 116 for as long as feasible, in order to harden the backing material 118 (step 311). The composite 124 feeds via directional rollers 130, 132, 134 for inspection (step 313) then to a roll up 126 for formation into a shipping roll 128 (step 315).

In a further embodiment of the method diagrammed in FIGS. 1 and 4, chilled roller 14 or 116 can have patterns projecting from its surface. As the fabric and backing material is pressed between roller 12 and chilled roller 14 or between roller 114 and chilled roller 116, the pattern is pressed into the surface of the backing material. The pattern can be a knurl, design, texture, or other pattern. The pattern can provide reduced-skid or non-skid properties to the fabric, or enhanced adhesion, useful in the case of carpets and some other applications. The pattern can also be an aesthetic design, texture, or pattern, or can display a logo, trademark, or other identifying matter.

In another embodiment of the method diagrammed in FIGS. 1 and 2, the fabric is preheated at preheat station 136 before being fed to the in-running nip point 10 or 112. The preheat temperature is chosen based on the weight, construction, and type of fabric, but is preferably between 120° F. and 275° F. The preheat step can be accomplished by contact, such as rolling the fabric over a contact roll or a contact plate heated by steam, oil, or electricity, or by a noncontact method such as infrared radiative heat or forced air.

Figure 7:
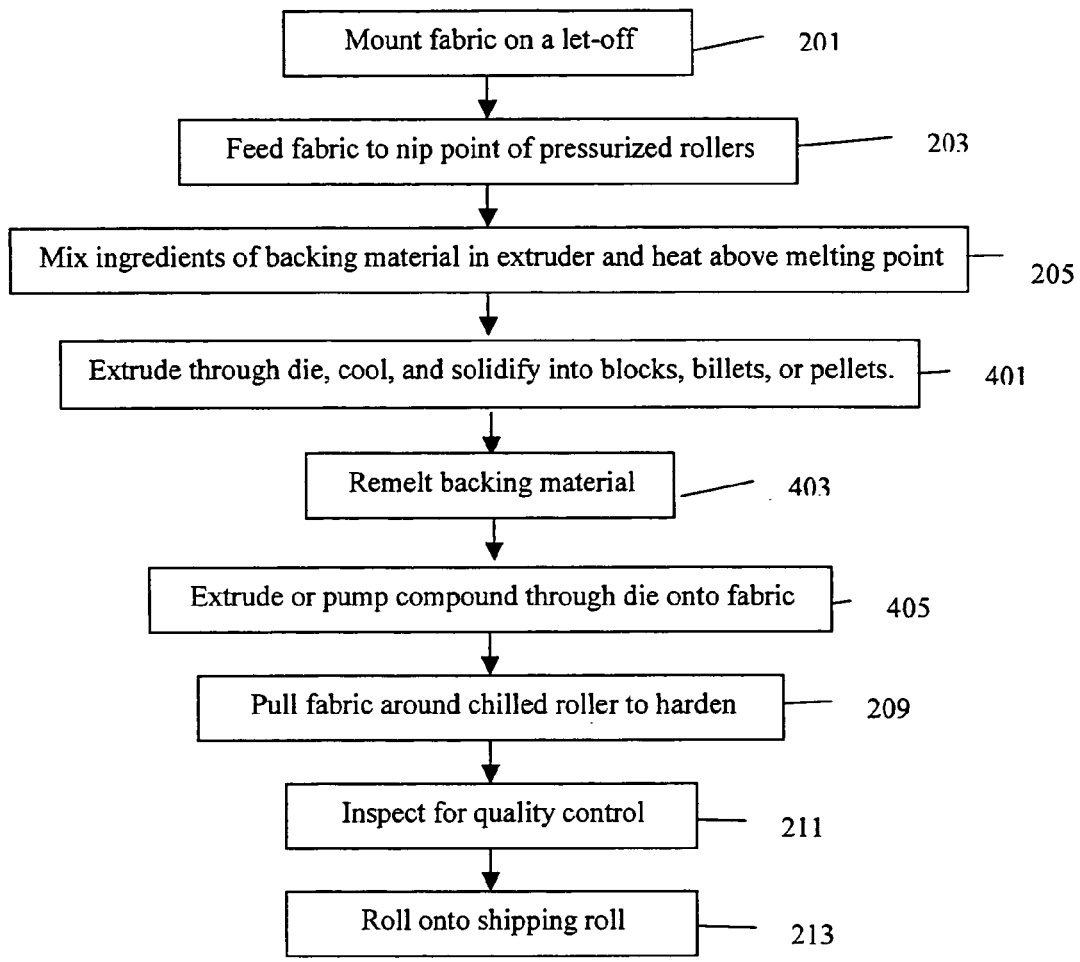
FIG. 7 is a flow chart of another embodiment of the method diagrammed in FIG. 3.

Alternatively, the backing material of the present invention can be made, solidified, stored in bulk, and later re-melted and applied to a fabric. This process is diagrammed in FIG. 7. Steps 201 through 205 and 209 through 213 are identical to the steps described in connection with FIG. 3. In this alternative, the backing material is again preferably made by mixing the ingredients described above in a co-rotating twin-screw extruder and heating those ingredients above the melting point of the mixture. The backing material is then forced through a die and cooled until it solidifies (step 401). The backing material can then be stored in bulk until needed.

For example, the backing material can be cooled and stored in a drum. When it is needed, a conventional drum melter is used to re-melt the backing material (step 403) and to pump the backing material either directly to a die or to a standard extruder for delivery to a die (step 405), for application to a fabric as described above. The more expensive twin-screw extruder described above is not needed for the application step, since the backing material has already been made and only needs to be re-melted and applied.

Alternatively, the backing material of the present invention can be made, solidified into blocks, billets, or pellets, stored, and later re-melted and applied to a fabric. In this alternative, the backing material is again preferably made by mixing the ingredients described above in a co-rotating twin-screw extruder and heating those ingredients above the melting point of the mixture. The backing material is then forced through a die, cooled until it solidifies, and then processed into blocks, billets or pellets (step 401). Equipment associated with processing into blocks, billets, and pellets is conventional and accordingly need not be further described. The backing material can then be stored until needed. In this alternative, the pellets can be introduced into a standard, single-screw extruder for re-melting (step 403) and extrusion through a die to a fabric (step 404). Blocks, billets, or pellets can be liquefied in a heated mixer or other suitable melting device (step 403) and pumped either directly to a die or to a standard single screw extruder for delivery to a die (step 404), for application to a fabric.

While preferred embodiments of the present invention are shown and described, it is envisioned that those skilled in the art may devise various modifications of the present invention without departing from the spirit and scope of the appended claims.

We claim:

1. A polymer-coated fabric comprising:
    a textile fabric; and
    an extruded polymer coating adhered to a surface of said textile fabric, said extruded polymer coating comprising a blend of:
        a flexibilizer; and
        a low density polyethylene having a melt index greater than about 1,000 g/10 minutes.

2. The polymer-coated fabric of claim 1, wherein said blend is a melt blend.

3. The polymer-coated fabric of claim 1, wherein said fabric comprises fibers and said extruded polymer coating penetrates said fibers of said textile fabric sufficiently to provide fiber lock.

4. The polymer-coated fabric of claim 1, wherein said low density polyethylene has at least one of the properties of a number average molecular weight less than about 10,000, a weight average molecular weight less than about 35,000, or a specific gravity less than 0.92.

5. The polymer-coated fabric of claim 1, wherein said low density polyethylene has a specific gravity less than 0.92.

6. The polymer-coated fabric of claim 1, wherein said flexibilizer comprises at least one of a thermoplastic elastomer, a thermoplastic rubber, a contained geometry catalyzed low-density polyethylene, ethylene methylacrylate, ethylene vinyl acetate and ethylene butyl modified polyethylene.

7. The polymer-coated fabric of claim 1 further comprising at least one filler.

8. The polymer-coated fabric of claim 7, wherein said at least one filler comprises at least one of magnesium hydroxide, stearic acid, Portland cement, calcium carbonate and calcium oxide.

9. The polymer-coated fabric of claim 1 further comprising a structural substrate attached to said extruded polymer coating opposite said textile fabric.

10. The polymer-coated fabric of claim 9, wherein said structural substrate comprises filaments of at least one of fiberglass, basalt, polypropylene, polyolefin, polymerized non-olefin, polyamide, polyester or nylon.

11. The polymer-coated fabric of claim 9, wherein said structural substrate comprises a pre-formed foam.

12. The polymer-coated fabric of claim 11, wherein said pre-formed foam comprises at least one of a thermoplastic material, a thermoset material, a stabilized chemically-blown material, a stabilized mechanically-blown material and an unstabilized mechanically-blown material.

13. A carpet comprising:
a carpet backing material; and
an extruded polymer coating adhered to a surface of said carpet backing material, said extruded polymer coating comprising a blend of:
a flexibilizer; and
a low density polyethylene having a melt index greater than about 1,000 g/10 minutes.

14. The carpet of claim 13, wherein said blend is a melt blend.

15. The carpet of claim 14, wherein carpet backing material comprises fibers and said extruded polymer coating penetrates said fibers of said carpet backing material sufficiently to provide fiber lock.

16. The carpet of claim 15, wherein said low density polyethylene has at least one of the properties of a number average molecular weight less than about 10,000, a weight average molecular weight less than about 35,000, or a specific gravity less than 0.92.

17. The carpet of claim 15, wherein said low density polyethylene has a specific gravity less than 0.92.

18. The carpet of claim 13, wherein said flexibilizer comprises at least one of a thermoplastic elastomer, a thermoplastic rubber, a contained geometry catalyzed low-density polyethylene, ethylene methylacrylate, ethylene vinyl acetate and ethylene butyl modified polyethylene.

19. The carpet of claim 17 further comprising a structural substrate attached to said extruded polymer coating opposite said carpet backing material.

20. The carpet of claim 19, wherein said structural substrate comprises filaments of at least one of fiberglass, basalt, polypropylene, polyolefin, polymerized non-olefin, polyamide, polyester or nylon.

21. The carpet of claim 19, wherein said structural substrate comprises a pre-formed foam.

22. The carpet of claim 21, wherein said pre-formed foam comprises at least one of a thermoplastic material, a thermoset material, a stabilized chemically-blown material, a stabilized mechanically-blown material and an unstabilized mechanically-blown material.

23. A method comprising the steps of:
forming a melt blend of a composition comprising:
a flexibilizer; and
a low density polyethylene having a melt index greater than about 1,000 g/10 minutes; and
applying said melt blend to a surface of a textile fabric.

24. The method of claim 23, wherein said low density polyethylene has at least one of the properties of a number average molecular weight less than about 10,000, a weight average molecular weight less than about 35,000, or a specific gravity less than 0.92.

25. The method of claim 23, wherein said low density polyethylene has a specific gravity less than 0.92.

26. The method of claim 23, wherein said flexibilizer comprises at least one of a thermoplastic elastomer, a thermoplastic rubber, a contained geometry catalyzed low-density polyethylene, ethylene methylacrylate, ethylene vinyl acetate and ethylene butyl modified polyethylene.

27. The method of claim 26, wherein said composition is applied to said textile fabric surface by extruding the composition in a layer directly onto said surface of said textile fabric.

28. The method of claim 26, wherein said textile fabric comprises a carpet backing material.

29. The method of claim 28 further comprising applying a structural substrate to said layer of said composition opposite said textile fabric.

30. The method of claim 29, wherein said structural substrate comprises filaments of at least one of fiberglass, basalt, polypropylene, polyolefin, polymerized non-olefin, polyamide, polyester or nylon.

31. The method of claim 29, wherein said structural substrate comprises a pre-formed foam.

32. The method of claim 31, wherein said pre-formed foam comprises at least one of a thermoplastic material, a thermoset material, a stabilized chemically-blown material, a stabilized mechanically-blown material and an unstabilized mechanically-blown material.

33. A method comprising the steps of:
melt extruding onto a surface of a fabric comprising fibers a composition comprising:
a flexibilizer; and
a low density polyethylene having a melt index greater than 1,000 g/10 minutes;
wherein said composition penetrates said fibers of said fabric sufficiently to provide fiber lock.

* * * * *